United States Patent [19]
Hung

[11] Patent Number: 5,748,424
[45] Date of Patent: May 5, 1998

[54] ELECTRICAL PLUG RECEPTACLE

[75] Inventor: Jerry Hung, Taipei Hsien, Taiwan

[73] Assignee: Primax Electronics Ltd., Taipei Hsien, Taiwan

[21] Appl. No.: 534,119

[22] Filed: Sep. 26, 1995

[51] Int. Cl.⁶ .................................................. H02H 9/00
[52] U.S. Cl. ............................ 361/56; 361/111; 439/652
[58] Field of Search ............................ 361/56, 91, 104,
361/111, 118, 58, 119, 127, 732, 740, 741,
747, 753, 759; 174/51, 58, 152 R, 153 R,
158 R; 439/76.1, 535, 653, 638, 639, 652

[56] References Cited

U.S. PATENT DOCUMENTS

| | | | |
|---|---|---|---|
| 4,876,713 | 10/1989 | Crosby et al. | 361/56 |
| 4,934,962 | 6/1990 | Luu et al. | 439/651 |
| 5,383,799 | 1/1995 | Fladung | 439/652 |
| 5,466,165 | 11/1995 | Boesel et al. | 439/638 |

*Primary Examiner*—Ronald W. Leja
*Attorney, Agent, or Firm*—Lackenbach Siegel Marzullo Aronson & Greenspan, P.C.

[57] ABSTRACT

The present invention provides an electrical plug receptacle which includes a housing including a cover having a primary wall and a perimetral wall respectively including a plurality of prong-receiving apertures, and a plate opposite to said primary wall, having a pair of prong projecting through holes and engaging with the cover so as to define an inner space of the housing, a conducting attaching set passing through the pair of prong projecting through holes from an inside of the housing and adapted for attaching the electrical plug receptacle to a wall receptacle, a retaining set encased in the housing, electrically connected to the conducting attaching set and corresponding to the plurality of prong-receiving apertures for retaining therein a plug of an electrical appliance, and a circuit encased in the housing and electrically connected to the conducting attaching set for protecting the electrical appliance when there is a surge voltage. Such an electrical plug receptacle receives the electrical appliance adaptors not only from the primary wall but also from the perimetral wall, and preferably includes a protective circuit which is highly recommended as a safety guard for effectively preventing accidents.

18 Claims, 3 Drawing Sheets

ELECTRICAL PLUG RECEPTACLE

FIELD OF THE INVENTION

The present invention relates to an electrical plug receptacle, and more particularly to an electrical plug receptacle respectively having on the primary wall and the perimeter wall having a plurality of prong-receiving apertures.

BACKGROUND OF THE INVENTION

The prior electrical plug receptacles usually have prong-receiving apertures only on their two side walls, which are applicable only for the plugs of ordinary electrical appliances but not for larger plugs such as power adaptors of a facsimile or a modem. Consequently, their applications are limited.

Recently, many of the prior electrical plug receptacles have already been provided a protective circuit mainly with a fuse connected in series with a metal oxide varistor (MOV). Generally, the prior electrical plug receptacles include a plurality of such circuit protective devices so that the MOV can absorb a surge voltage accidentally inputted to the electrical appliance in use. As a matter of fact, even though the fuse of the protective circuit will be blown when the MOV is damaged, because of the unbearable surge voltage, the whole circuit is still full of current which will be dangerous if the circuit is still in use.

SUMMARY OF THE INVENTION

The main object of the present invention is to provide electrical plug receptacles on the primary wall, as well as on the perimeter wall, but with a plurality of prong-receiving apertures for larger plugs.

Another object of the present invention is to provide a protective circuit for cutting off the electrical current so as to secure an electrical appliance when a surge voltage is encounted.

In accordance with the present invention, an electrical plug receptacle comprises a housing including a cover having a primary wall and a perimeter wall respectively including a plurality of prong-receiving apertures, and a plate opposite to the primary wall, having a pair of prong projecting through holes and engaging with the cover so as to define an inner space of the housing, a conducting attaching set passing through the pair of prong projecting through holes from inside of the housing and adapted for attaching the electrical plug receptacle to a wall receptacle, and a retaining set encased in the housing, electrically connected to the conducting attaching set and corresponding to the plurality of prong-receiving apertures for retaining therein a plug of an electrical appliance.

In accordance with a first aspect of the present invention, the electrical plug receptacle further comprises a circuit encased in the housing and electrically connected to the conducting attaching set for protecting the electrical appliance when there is a surge voltage.

In accordance with a second aspect of the present invention, the circuit is a printed circuit board (PCB).

In accordance with a third aspect of the present invention, the cover includes a plurality of supporting media and a plurality of positioning media respectively protruding in said inner space for securing therein the conducting attaching set, the retaining set and the PCB.

In accordance with a fourth aspect of the present invention, the plurality of supporting media and the plurality of positioning media are integrally formed to the housing.

In accordance with a fifth aspect of the present invention, the conducting attaching set includes a conducting strip and an pillar respectively welded to the PCB, and the retaining set includes a first and a second conducting holding strips suitably secured, such as by welding to the PCB and respectively corresponding to the plurality of prong-receiving apertures of the primary wall, a holding pillar connected to the pillar of the attaching set and corresponding to the plurality of prong-receiving apertures of the primary wall, a supporting piece provided with two flutes, a groove and a plurality of through holes respectively corresponding to the plurality of prong-receiving apertures, and third and fourth conducting holding strips are respectively held in said two flutes and electrically connected to the first and the second conducting holding strips, and a second holding pillar is held in the groove of the supporting piece and electrically connected to the PCB; whereby the conducting attaching set, the retaining set and the PCB form an electrical path.

In accordance with a sixth aspect of the present invention, the PCB further includes a plurality of metal oxide varistors (MOVs) for absorbing a surge voltage so as to protect the electrical appliance, a light-emitting diode (LED) electrically connected to the plurality of MOVs, lights up when the plurality of MOVs are all under normal condition and is not lit up when one of the plurality of MOVs is damaged by the surge voltage, and an alarm, such as buzzer electrically connected to the plurality of MOVs buzzes when one of the MOVs is damaged.

In accordance with a seventh aspect of the present invention, the circuit further includes a thermal fuse in contact with the plurality of MOVs so that the thermal fuse will be in a broken circuit to cut off an external electrical power when the one MOV is damaged.

In accordance with an eighth aspect of the present invention, the thermal fuse and the plurality of MOVs are bound together by an insulating adhesive tape.

In accordance with a ninth aspect of the present invention, the cover further includes a light transmitting hole and a light scattering plate at a position corresponding to the LED.

In accordance with a tenth aspect of the present invention, the electrical plug receptacle further comprises at least one telephone line adapter provided on the cover and electrically connected to the PCB.

In accordance with a eleventh aspect of the present invention, the electrical plug receptacle further comprises at least one coaxial line adapter provided on the cover and electrically connected to the PCB.

In accordance with a twelfth aspect of the present invention, the plate further includes an integrally formed projecting reinforcing column.

In accordance with a thirteenth aspect of the present invention, the cover and the plate of the housing are welded together by an ultrasonic wave.

In accordance with the present invention, an electrical plug receptacle comprises a housing including a cover having a primary wall and a perimeter wall respectively including a plurality of prongs-receiving apertures, and a plate opposite to said primary wall, having a pair of prong projecting through holes and engaging with the cover so as to define an inner space of the housing. A conducting attaching set passing through the pair of prongs project through the holes from an inside of the housing and is adapted for attaching the electrical plug receptacle to a wall receptacle. A retaining set is encased in the housing, and electrically connected to the conducting attaching set and corresponds to the plurality of prong-receiving apertures for retaining therein a plug of an electrical appliance, and a circuit encased in the housing and electrically connected to the conducting attaching set protects the electrical appliance when there is a surge voltage.

The present invention may best be understood through the following description with reference to the accompanying drawings, in which:

DETAILED DESCRIPTION OF THE PREFERRED EMBODIMENT

Figure 1:
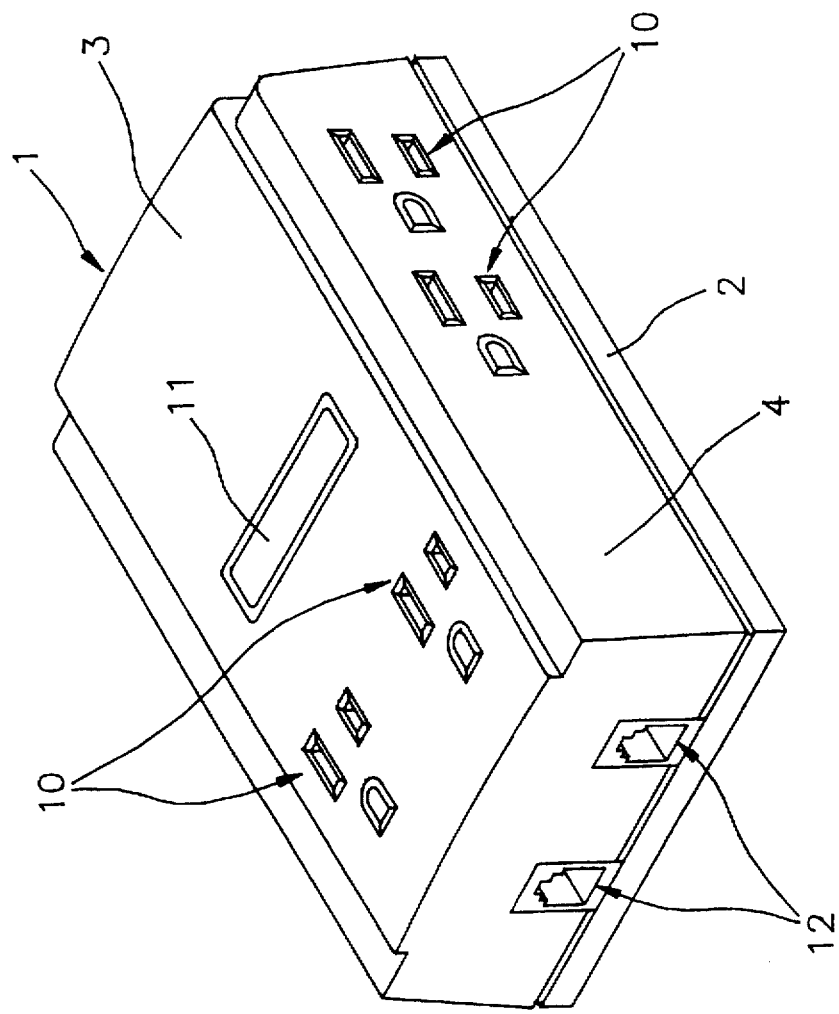
FIG. 1 is a perspective view of a preferred embodiment of an electrical plug receptacle of the present invention.
Figure 2:
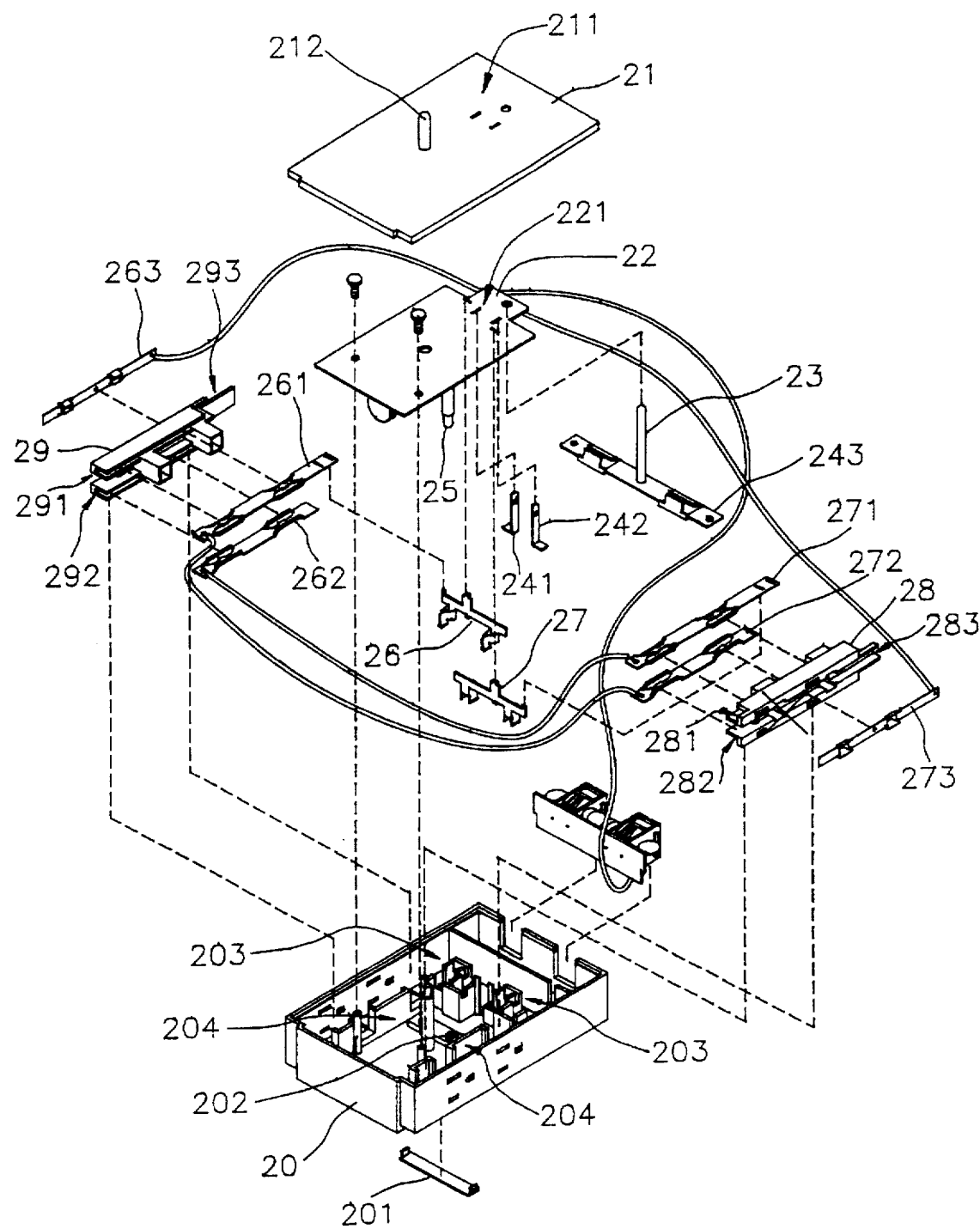
FIG. 2 is a schematic view showing disassembled the various parts of a preferred embodiment of an electrical plug receptacle of the present invention.
Figure 3:
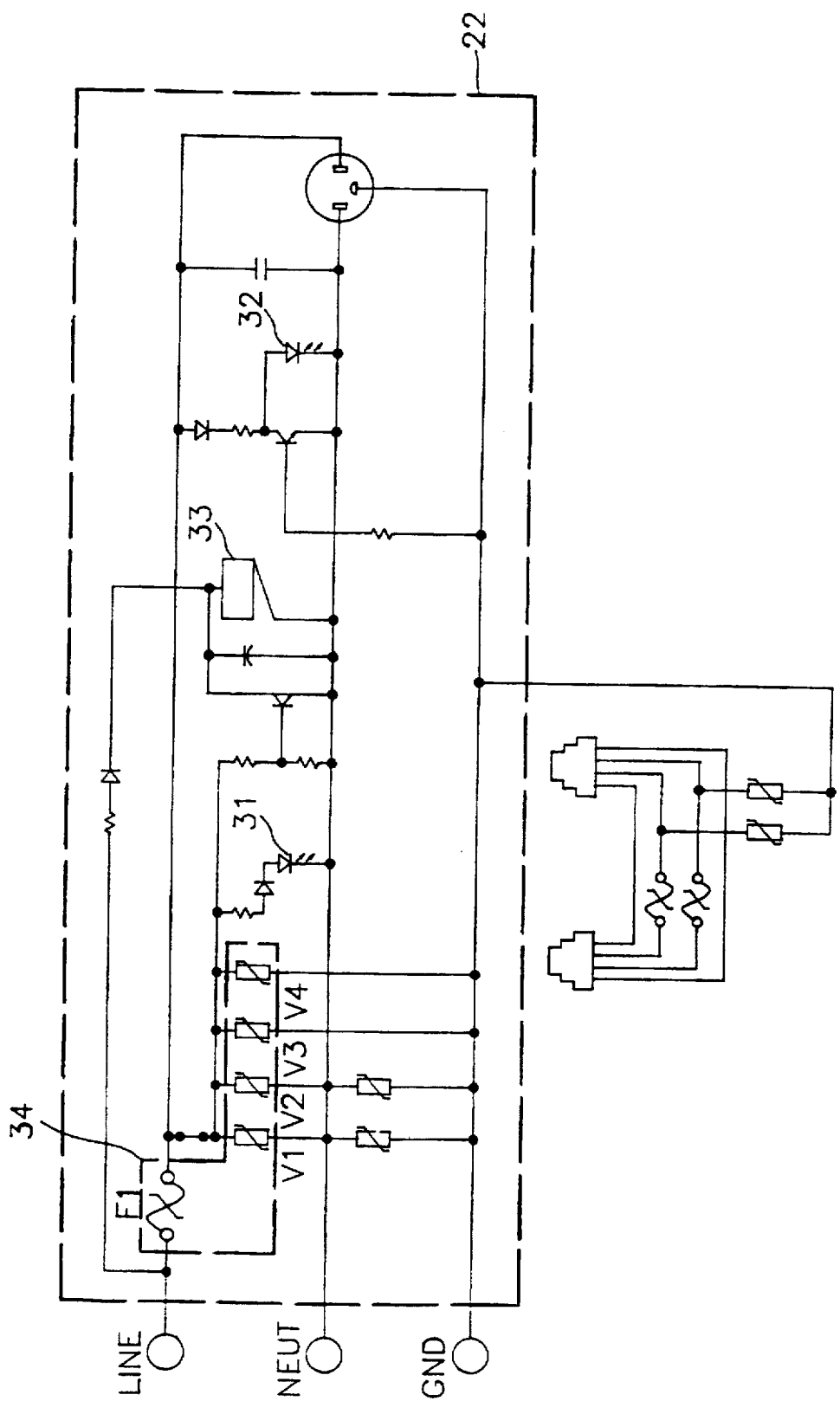
FIG. 3 is an electrical wiring diagram showing a preferred embodiment of a protective circuit for a facsimile or a modem protection according to the present invention.

Referring to FIGS. 1 and 2, the present electrical plug receptacle comprises a housing including a cover 1 having a primary wall 3 and a perimeter wall 4 respectively including a plurality of prong-receiving apertures 10, and a plate 2 opposite to said primary wall 3, having a set of prongs projecting through holes 211 (see FIG. 2) and engaging with the cover 1 so as to define an inner space of the housing, a conducting attaching set passing through the prong projecting through holes 211 from an inside of the housing and adapted for attaching the electrical plug receptacle to a wall receptacle, a retaining set encased in the housing, electrically connected to the conducting attaching set and corresponding to the plurality of prong-receiving apertures 10 for retaining therein a plug of an electrical appliance, and a circuit 22, as best shown in FIG. 3, encased in the housing and electrically connected to the conducting attaching set for protecting the electrical appliance when there is a surge voltage. As a result, except for the prong-receiving apertures 10 provided on the perimeter wall 4 of the cover 1, the primary wall 3 is also provided with prong-receiving apertures 10. Consequently, when the present receptacle is attached to a wall receptacle, some of the larger plugs, e.g., power adaptors of a facsimile or a modem, being previously unable to be received by the perimeter prong-receiving apertures 10 may be front adapted to the electrical plug receptacle. Preferably, the light scattering plate 11 (not shown) is provided on the cover 1 at a position corresponding to a LED for enhancing the light when in use. Further, the electrical plug receptacle includes two telephone line adaptors 12 (e.g., a RJ-11) electrically connected to a printed circuit board (PCB) so as to fully prepare for transmitting the telephone lines. Certainly, the coaxial line adaptors 12 can also be included with/without adaptors for extended applications.

Referring to FIG. 2, the conducting attaching set, the retaining set and the PCB 22 are mounted in the space defined by the cover 20 and the plate 21 the later two of which are assembled by an ultrasonic wave. The conducting attaching set includes two conducting strips 241 and 242 and an earthing pillar 23 respectively welded to the PCB 22, which pass through the PCB holes 221 respectively corresponding to the prong projecting through holes 211 so as to be received by the wall receptacle.

The retaining set includes two conducting holding strips 26 and 27 respectively corresponding to the primary wall prong-receiving apertures and one holding pillar 243. The other two conducting holding strips 28 and 29 respectively corresponding to the perimeter wall prong-receiving apertures and respectively having two flutes 281 and 282 (292 and 291), one groove 283 (293), and two conducting holding strips 271 and 272 (261 and 262) respectively held in the two flutes 281 and 282 (292 and 291) and one earthing holding pillar 273 (263) is held in the groove 283 (293).

The conducting holding strip 26 is suitably joined or welded to the PCB 22, electrically connected to the conducting strip 241, correspondingly welded to the conducting holding strip 261 and electrically connected to the conducting holding strip 272 by a conducting wire. The other conducting holding strip 27 is also welded to the PCB 22, and is electrically connected to the conducting strip 242 through a thermal fuse F1 (as can seen from FIG. 3) of the printed circuit, and correspondingly welded to the conducting holding strip 271 and electrically connected to the conducting holding strip 262 by another conducting wire. Finally, the holding pillar 243 is joined with the pillar 23 and the two side holding pillars 273 and 263 are also electrically connected to the PCB 22 by a conducting wire so as to connect with the pillar 23 in order to thus complete an electrical path of the present electrical plug receptacle.

Besides, the cover 20 includes a plurality of supporting media 203 for securing the two conducting holding strips 26 and 27 and a plurality of positioning media 204 respectively protruding in the inner space for securing the two conducting holding strips 28 and 29 therein, wherein the supporting media 203 and the positioning media 204 are integrally formed to the housing so as to assure a complete contact between the conducting holding strip 26 (27) and the plug of an electrical appliance when in use.

Further, the cover 20 includes a light transmitting hole 202 and a light scattering plate 201 at a position corresponding to the LED 25. The LED 25 will light when in normal condition, and the light beams can pass through the light transmitting hole 202 and the light scattering plate 201 so as to scatter into the outer space; on the contrary, the LED will not light when in and abnormal condition such as when damage is caused by a surge voltage.

Also, the telephone line adaptors 12 shown in FIG. 1 provide a function for transmitting the telephone lines.

Moreover, the plate 21 of the housing further includes an integrally formed projecting reinforcing column on its outer surface for firmly attaching the present invention to the wall receptacle.

FIG. 3 is a protective circuit of a facsimile or a modem, which uses a thermal fuse F1 electrically connected to the conducting strips 242 (as shown in FIG. 2) of LINE-NEUTRAL and LINE-GROUND MOVs, and the thermal fuse F1 is bound together by an insulating adhesive tape 34 with four such MOVs (V1, V2, V3 and V4). Once one of the four MOVs is damaged through a surge voltage, the thermal fuse F1 will cut off the alternate circuit (AC) input in order to prevent adverse danger thereof; in the meantime, the LEDs 31 and 32 will not light and the sound alarm or buzzer 33 will buzz for warning the user of the breakdown of the protective circuit.

To sum up, the present electrical plug receptacle can receive electrical appliance adaptors, such as power adaptors of a facsimile or a modem, in the prong-receiving apertures of the primary wall but also the perimeter wall, which preferably includes a protective circuit that is highly recommended as a safety guard for effectively preventing accidents.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electrical plug receptacle comprising:

a housing including a cover having a primary wall, and a perimeter wall each of which includes a plurality of prong-receiving apertures, and a plate opposite to said primary wall, having a pair of prong-projecting through holes and engaging with said cover so as to define an inner space of said housing;

a conducting attaching set passing through said pair of prong-projecting through holes from inside of said housing and adapted for attaching said electrical plug receptacle to a wall receptacle;

a retaining set encased in said housing, electrically connected to said conducting attaching set and corresponding to each said plurality of prong-receiving apertures for retaining therein a plug of an electrical appliance;

a circuit formed upon a printed circuit board (PCB), encased in said housing and electrically connected to said conducting attaching set for protecting said electrical appliance when there is a surge voltage, and wherein said conducting attaching set includes a conducting strip and a pillar respectively secured to said PCB; and said retaining set including first and second conducting holding strips secured to said PCB and respectively corresponding to said plurality of prong-receiving apertures of said primary wall;

a holding pillar connected to said pillar of said attaching set and corresponding to said plurality of prong-receiving apertures of said primary wall;

a supporting piece provided with a plurality of flutes, a groove and a plurality of through holes respectively corresponding to said plurality of prong-receiving apertures of said perimeter wall;

third and fourth conducting holding strips respectively held in said plurality of flutes and electrically connected to said first and said second conducting holding strips; and a second holding pillar held in said groove of said supporting piece and electrically connected to said circuit formed upon said PCB, whereby said conducting attaching set, said retaining set and said circuit formed upon said PCB form an electrical path.

2. An electrical plug receptacle according to claim 1, wherein said cover includes a plurality of supporting media and a plurality of positioning media respectively protruding in said inner space for securing therein said conducting attaching set, said retaining set and said PCB.

3. An electrical plug receptacle according to claim 2, wherein said plurality of supporting media and said plurality of positioning media are integrally formed to said housing.

4. An electrical plug receptacle according to claim 1, wherein said PCB further includes:

a plurality of metal oxide varistors (MOVs) for absorbing a surge voltage so as to protect said electrical appliance;

a light-emitting diode (LED) electrically connected to said plurality of MOVs, which will light when said plurality of MOVs are all under a normal condition and will not light when one of said plurality of MOVs is damaged by said surge voltage; and an audible alarm electrically connected to said plurality of MOVs for generating an audible alarm when said one MOV is damaged.

5. An electrical plug receptacle according to claim 4, wherein said circuit further includes a thermal fuse in contact with said plurality of MOVs for cutting off an external electrical power source when said one MOV is damaged.

6. An electrical plug receptacle according to claim 5, wherein said thermal fuse and said plurality of MOVs are bound together by an insulating adhesive tape.

7. An electrical plug receptacle according to claim 4, wherein said cover further includes a light transmitting hole and a light scattering plate at a position corresponding to said LED.

8. An electrical plug receptacle according to claim 1, further comprising at least one telephone line adaptor provided on said cover and electrically connected to said circuit formed upon said PCB.

9. An electrical plug receptacle according to claim 1, further comprising at least one coaxial line adaptor provided on said cover and electrically connected to said circuit formed upon said PCB.

10. An electrical plug receptacle according to claim 1, wherein said plate further includes an integrally formed projecting reinforcing column.

11. An electrical plug receptacle according to claim 1, wherein said cover and said plate of said housing are secured by being welded together by ultrasonic means.

12. An electrical plug receptacle comprising:

a housing including a cover having a primary wall, and a perimeter wall each of which includes a plurality of prong-receiving apertures, and a plate opposite to said primary wall, having a pair of prong-projecting through holes and engaging with said cover so as to define an inner space of said housing;

a conducting attaching set passing through said pair of prong-projecting through holes from inside of said housing and adapted for attaching said electrical plug receptacle to a wall receptacle;

a retaining set encased in said housing, electrically connected to said conducting attaching set and corresponding to each said plurality of prong-receiving apertures for retaining therein a plug of an electrical appliance;

a circuit formed upon a printed circuit board (PCB), and encased in said housing and electrically connected to said conducting attaching set for protecting said electrical appliance when there is a surge voltage;

said cover including a plurality of supporting media and a plurality of positioning media respectively protruding in said inner space for securing therein said conducting attaching set, said retaining set and said PCB; and said conducting attaching set including a conducting strip and a pillar respectively welded to said PCB, and said retaining set includes:

a first and a second conducting holding strip welded to said PCB and respectively corresponding to said plurality of prong-receiving apertures of said primary wall;

a holding pillar connected to said pillar of said attaching set and corresponding to said plurality of prong-receiving apertures of said primary wall;

a supporting piece provided with two flutes, a groove and a plurality of through holes respectively corresponding to said plurality of prong-receiving apertures of said perimeter wall;

a third and a fourth conducting holding strip respectively held in said two flutes and electrically connected to said first and said second conducting holding strips; and a second holding pillar held in said groove of said supporting piece and electrically connected to said PCB;

whereby said conducting attaching set, said retaining set and said PCB form an electrical path.

13. The electrical plug receptacle according to claim 12, wherein said PCB further includes:

a plurality of metal oxide varistors (MOVs) for absorbing a surge voltage so as to protect said electrical appliance;

a light-emitting diode (LED) electrically connected to said plurality of MOVs, which will light when said plurality of MOVs are all under a normal condition and will not light when one of said plurality of MOVs is damaged by said surge voltage.

14. An electrical plug receptacle according to claim 13, wherein said circuit further includes a thermal fuse in contact with said plurality of MOVs for cutting off an external electrical power source when said one MOV is damaged.

15. An electrical plug receptacle according to claim 13, wherein said cover further includes a light transmitting hole and a light scattering plate at a position corresponding to said LED.

16. An electrical plug receptacle according to claim 12, further comprising at least one telephone line adaptor provided on said cover and electrically connected to said circuit formed upon said PCB.

17. An electrical plug receptacle according to claim 12, further comprising at least one coaxial line adaptor provided on said cover and electrically connected to said circuit formed upon said PCB.

18. An electrical plug receptacle comprising:

a housing including a cover having a primary wall, and a perimeter wall each of which includes a plurality of prong-receiving apertures, and a plate opposite to said primary wall, having a pair of prong-projecting-through-holes and engaging with said cover so as to define an inner space of said housing;

a conducting attaching set passing through said pair of prong-projecting-through-holes from inside of said housing and adapted for attaching said electrical plug receptacle to a wall receptacle;

a retaining set encased in said housing, electrically connected to said conducting attaching set and corresponding to each said plurality of prong-receiving apertures for retaining therein a plug of an electrical appliance;

a circuit formed upon a printed circuit board (PCB), encased in said housing and electrically connected to said conducting attaching set for protecting said electrical appliance when there is a surge voltage, and wherein said conducting attaching set includes a conducting strip and pillar respectively secured to said PCB; and said retaining set including first and second conducting holding strips secured to said PCB and respectively corresponding to said plurality of prong-receiving apertures of said primary wall;

said cover including a plurality of supporting media and a plurality of positioning media respectively protruding in said inner space for securing therein said conducting attaching set, said retaining set and said PCB;

a holding pillar connected to said pillar of said attaching set and corresponding to said plurality of prong-receiving apertures of said primary wall;

a supporting piece provided with two flutes, a groove and a plurality of through holes respectively corresponding to said plurality of prong-receiving apertures of said perimeter wall;

third and fourth conducting holding strips respectively held in said two flutes and electrically connected to said first and said second conducing holding strips; and a second holding pillar held in said groove of said supporting piece and electrically connected to said circuit formed upon said PCB, whereby said conducting attaching set, said retaining set and said circuit formed upon said PCB form an electrical path.

* * * * *